United States Patent [19]
Chen

[11] Patent Number: 5,647,681
[45] Date of Patent: Jul. 15, 1997

[54] STAIRS RAIL CONNECTOR

[76] Inventor: Chi-Fu Chen, No.263, Kuang-Hsing Road, Tai-Ping Hsiang, Taichung Hsien, Taiwan

[21] Appl. No.: 666,597

[22] Filed: Jun. 18, 1996

[51] Int. Cl.⁶ ........................................ B23K 1/00
[52] U.S. Cl. ..................... 403/270; 403/164; 403/300; 256/59; 256/67
[58] Field of Search ................. 256/59, 60, 65, 256/67, DIG. 2; 403/270–272, 265, 164, 165, 300, 301, 302, 309, 310, 313

[56] References Cited

U.S. PATENT DOCUMENTS

| | | | |
|---|---|---|---|
| 3,233,871 | 2/1966 | Schroer | 256/65 X |
| 3,552,775 | 1/1971 | Warner | 403/164 X |
| 3,733,055 | 5/1973 | Hughes, Jr. | 256/59 |
| 3,787,033 | 1/1974 | Snyder et al. | 256/59 |
| 4,475,840 | 10/1984 | Schmitt et al. | 256/67 X |
| 4,557,467 | 12/1985 | Lin | 256/59 |
| 4,637,589 | 1/1987 | Lin | 256/59 |
| 4,646,490 | 3/1987 | Naka et al. | 256/59 X |

FOREIGN PATENT DOCUMENTS

| | | | |
|---|---|---|---|
| 191208 | 8/1957 | Germany | 403/271 |
| 6-173407 | 6/1994 | Japan | 256/59 |

*Primary Examiner*—Harry C. Kim
*Attorney, Agent, or Firm*—Morton J. Rosenberg; David I. Klein

[57] ABSTRACT

A stairs rail connector which is pre-manufactured as a semicircular turning rail, including two curved tubes with identical dimension. Each curved tube has an interconnecting end and a connecting end. The interconnecting end of one curved tube is disposed with a shaft seat therein, while the interconnecting end of the other curved tube is disposed with a shaft ring therein, whereby the interconnecting ends are rotatably connected with each other, permitting the curved tubes to be freely 360 degrees rotated relative to each other. After the curved tubes are rotated to a position corresponding to the turning angle between an upper and a lower rails, the connecting ends of the curved tubes are inserted into and secured in the openings of the upper and lower rails to connect the same at the turning angle.

4 Claims, 3 Drawing Sheets

STAIRS RAIL CONNECTOR

BACKGROUND OF THE INVENTION

The present invention relates to a stairs rail connector which can be assembled with an upper and a lower stairs rails to connect the same at a turning angle very quickly.

A conventional semicircular tube-shaped stairs rail can be made of many kinds of materials. A high class one can be made of raw wooden material, while an ordinary one can be made of copper, aluminum or stainless steel material. However, the copper material is subject to rusting due to acid. The aluminum material has no facial brightness and is subject to scraping and collision. Therefore, the stairs rail made of stainless steel is the most widely used one, because the stainless steel material has bright surface and is not subject to scraping and is acid/alkali-resistant, abrasion-resistant as well as collision-resistant.

The conventional semicircular rail made of stainless steel is installed at the turning angle between the upper floor and lower floor rails generally by the following steps:

1. A semicircular (180 degrees) stainless steel tube with unified diameter is first precisely cut into two curved tubes through the central normal line. Otherwise, after relatively rotated, the cutting faces will be hardly match with each other.
2. The cutting faces of the two curved tubes are slightly attached to each other by adhesive agent and then the openings of the free ends of the curved tubes are precisely adjusted to a position parallel to the openings of the upper and lower rails. Then the cutting faces of the curved tubes are welded and secured to each other.
3. After welded, the free ends of the turning rail are welded and secured to the openings of the upper and lower rails.
4. Finally, the projecting welding seam is ground into a planar or smoother surface. The black scorched surface caused by the high temperature during welding operation is treated so that it will have a neat and bright appearance.

Several disadvantages exist in the above working procedures as follows:

1. The stainless steel has a higher melting point and it is difficult to be welded. Moreover, the welding operation is applied to a circular tube. This requires a welding expert or a skilled technician so that the working cost is relatively high.
2. In practice, installation of a turning rail necessitates the steps of cutting, rotating for comparison of angle, welding, grinding, planing, etc. Especially, the grinding and planing steps are extremely time-consuming. Furthermore, the transferring of the welding machine and the narrow working space will make it very inconvenient to work in the working site. Therefore, even though these steps are done by a welding expert or a skilled technician, only about three turning rails can be installed in one day. This increases the labor cost significantly.

Therefore, it is preferred that the turning rail is premanufactured with a variety of dimensions and specifications. So an ordinary worker can rotate the turning rail to a suitable angle in working site and then insert the turning rail into the upper and lower rails and then secure the turning rail therebetween. Accordingly, the working time and labor cost will be greatly reduced and the working can be completed more quickly.

SUMMARY OF THE INVENTION

It is therefore a primary object of the present invention to provide a stairs rail connector consisting of two identical curved tubes. Each curved tube has an interconnecting end and a small diameter connecting end. The interconnecting end of one curved tube is disposed with an interconnecting seat therein, while the interconnecting end of the other curved tube is disposed with two semicircular interconnecting rings therein, whereby the interconnecting ends are rotatably connected with each other, permitting the curved tubes to be freely 360 degrees rotated relative to each other. After the curved tubes are rotated to a position corresponding to the turning angle between an upper and a lower rails, the connecting ends of the curved tubes can be inserted into and secured in the openings of the upper and lower rails to connect the same at the turning angle. Such installation can be performed easily without specific technique and the working efficiency and quality are greatly enhanced.

The present invention can be best understood through the following description and accompanying drawing, wherein:

DETAILED DESCRIPTION OF THE PREFERRED EMBODIMENTS

Figure 1:
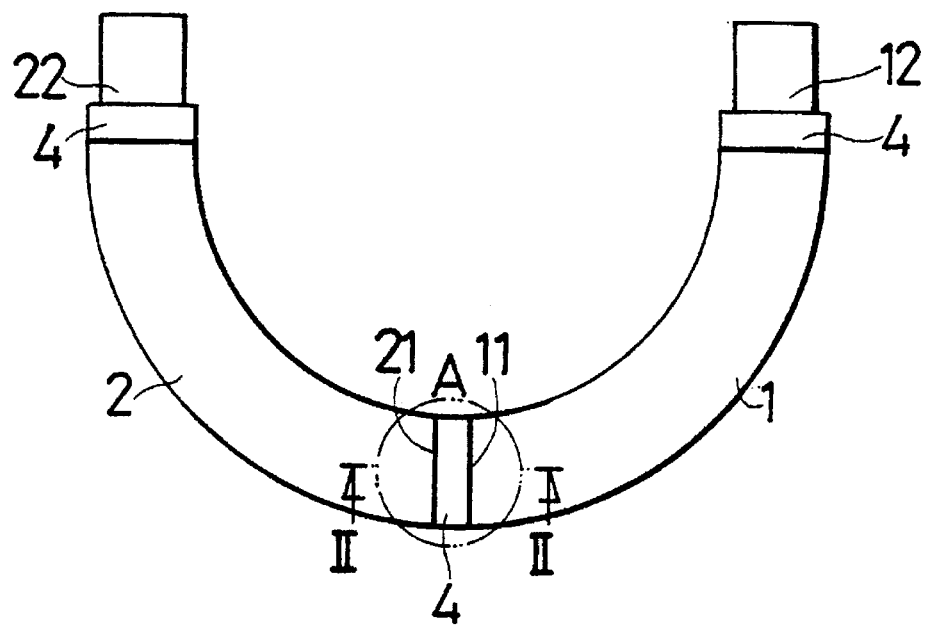
FIG. 1 is a lane assembled view of the present invention.
Figure 2:
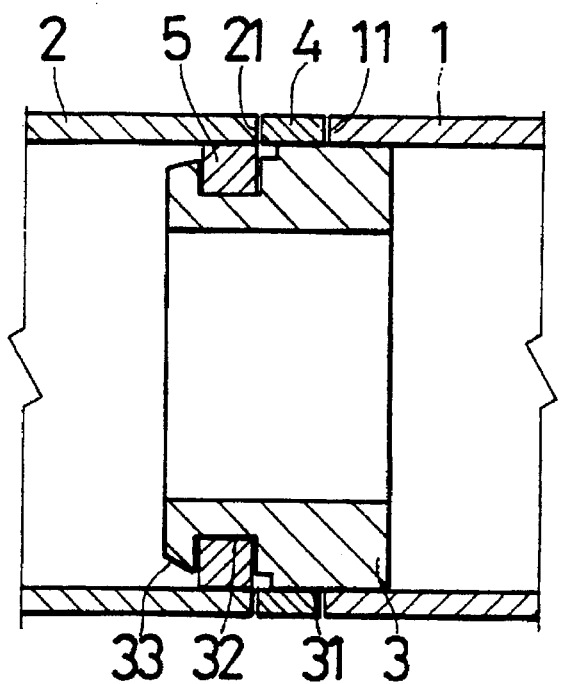
FIG. 2 is a sectional view taken along line II—II of FIG. 1.
Figure 3:
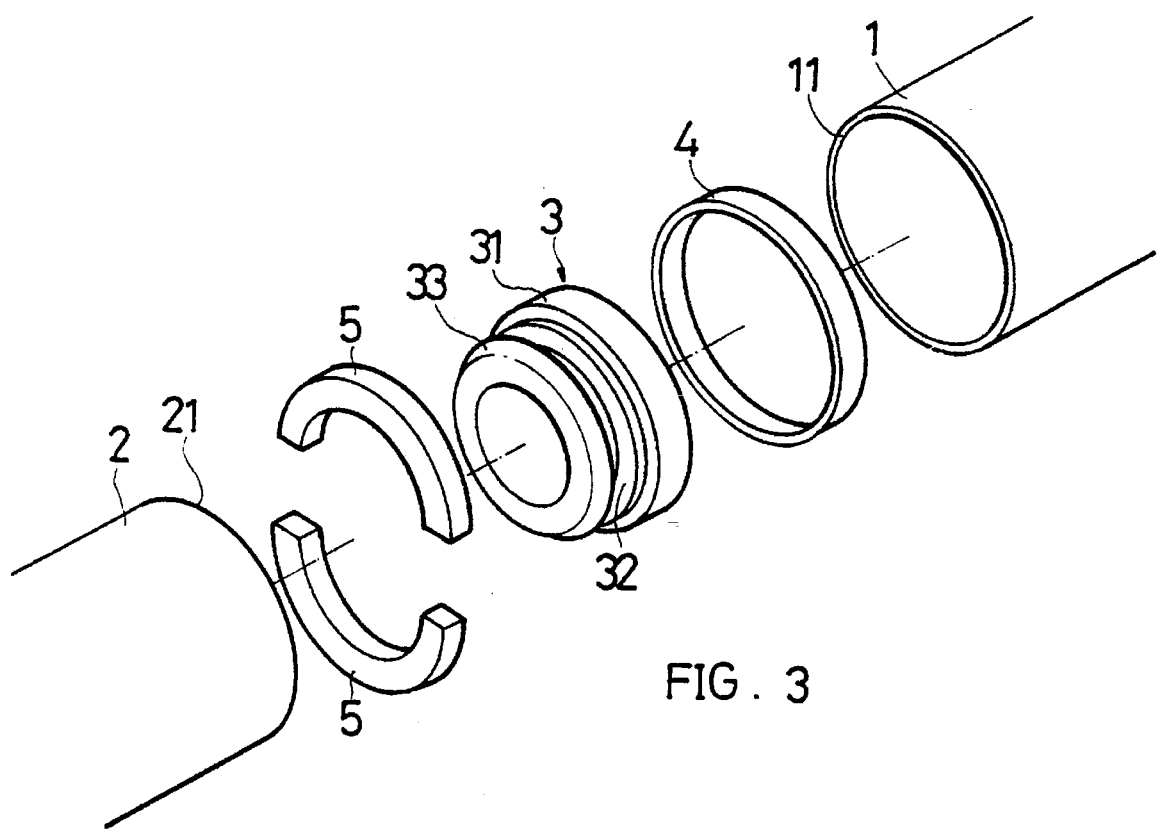
FIG. 3 is a perspective exploded view of area A of FIG. 2.

Please refer to FIGS. 1 to 3. The stairs rail connector of the present invention includes a first curved tube 1, a second curved tube 2, an interconnecting seat 3, three fitting rings 4 and two semicircular interconnecting rings 5.

The first and second curved tubes 1, 2 are made of stainless steel material and have identical shape and curvature- Each curved tube 1, 2 has an interconnecting end 11, 21 and a small diameter connecting end 12, 22. The outer diameter of the connecting end 12, 22 is equal to the inner diameter of the curved tube 1, 2. Two fitting rings 4 are respectively fitted around the connecting ends 12, 22.

The interconnecting seat 3 is disposed at the opening of the interconnecting end 11 of the first curved tube 1 and secured thereto by point welding. The outer periphery of the interconnecting seat contacts with the inner periphery of the interconnecting end 11 of the first curved tube 1. The interconnecting seat 3 has an extension section 31 axially forward extending by a certain length- The other fitting ring 4 is fitted around the extension section 31. An annular groove 32 is formed on the extension section 31. The extension section 31 has a frustum-like conic front end 33 for facilitating the fitting of the fitting ring 4.

These two semicircular interconnecting rings 5 are inserted into the annular groove 32 opposite to each other. The outer diameter of each interconnecting ring 5 is equal to the inner diameter of the interconnecting end 21 of the second curved tube 2 and the inner diameter of each interconnecting ring 5 is slightly larger than the outer diameter of the annular groove 32, whereby a clearance is defined therebetween for relative rotation. After the two interconnecting rings 5 are fitted into the interconnecting end 21 of the second curved tube 2 and secured therein by point welding, the fitting ring 4 is positioned between the interconnecting ends 11, 21 of the first and second curved tubes 1, 2, whereby the first and second curved tubes 1, 2 can be relatively rotated about the interconnecting seat 3 and the interconnecting rings 5.

Figure 4:
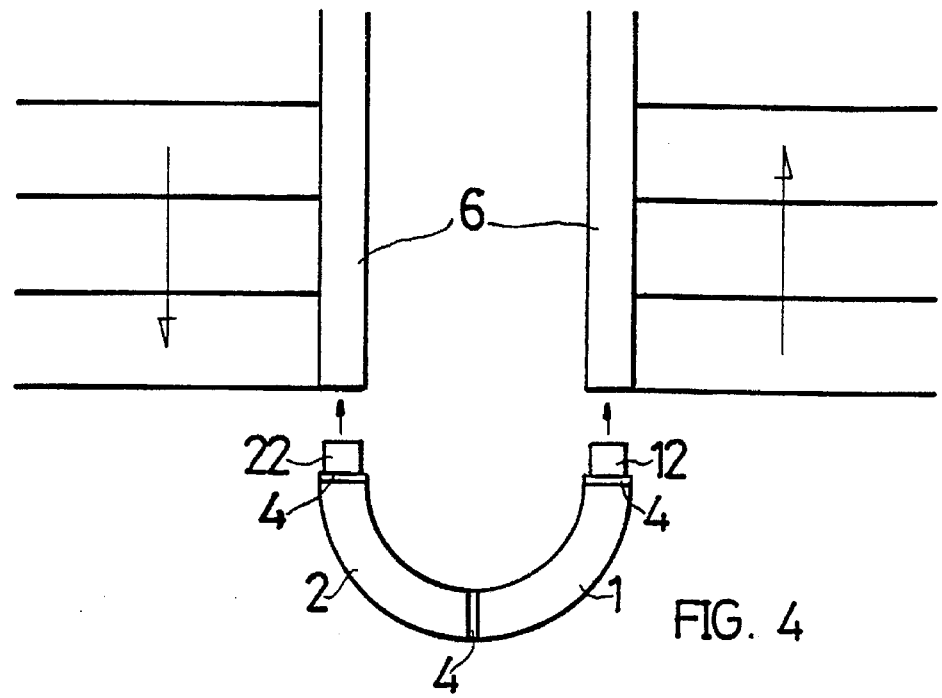
FIG. 4 is a top view showing the application of the present invention to an upper and a lower stairs rails.
Figure 5:
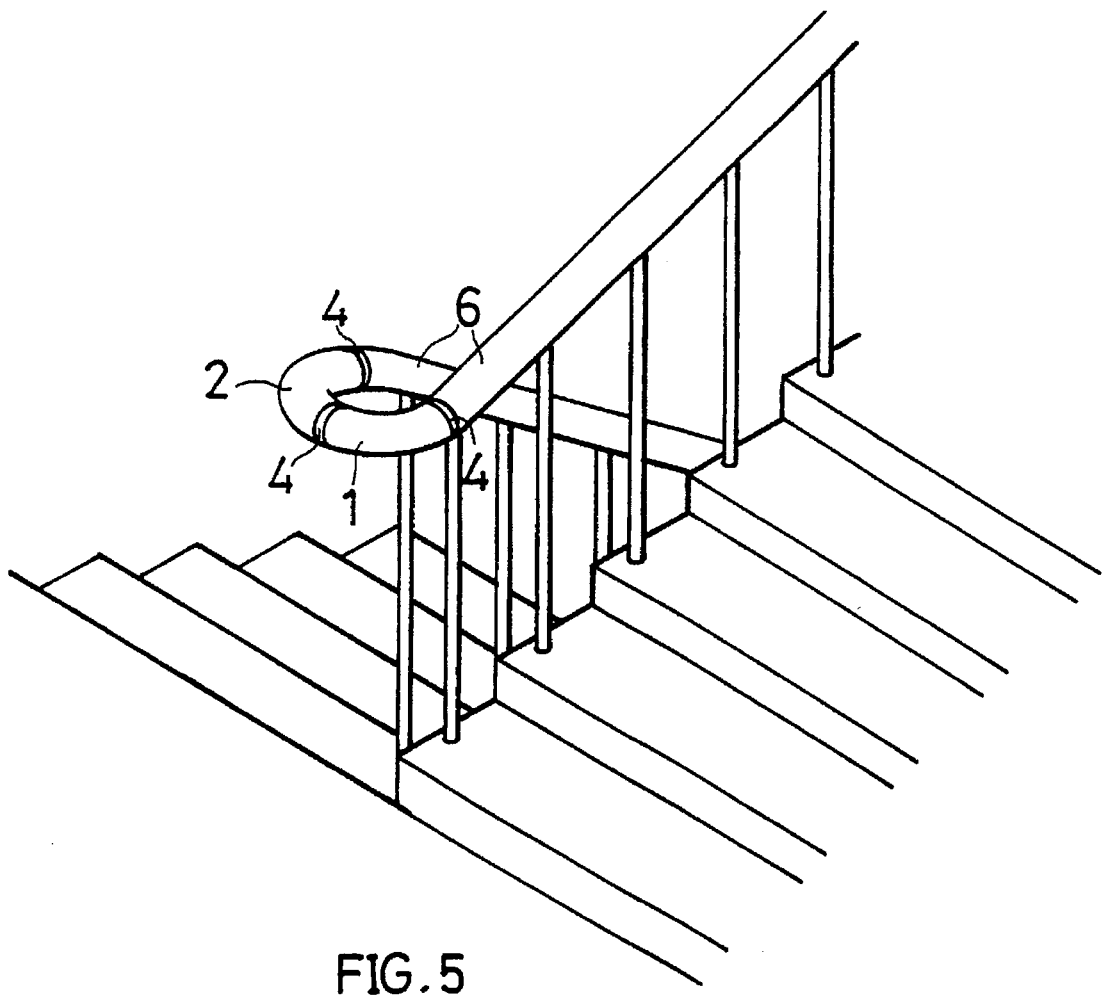
FIG. 5 is a perspective view showing that the stairs rail connector of the present invention is interconnected between the upper and lower stairs rails.

Please refer to FIGS. 4 and 5 which show the application of the connector to the stairs rail. The first and second curved tubes 1, 2 are first rotated to a position corresponding to the turning angle between an upper and a lower rails 6. Then the connecting ends 12, 22 are painted with an adhesive agent and inserted into the openings of the upper and lower rails 6. After the adhesive agent is solidified, the connector integrally connects the upper and lower rails 6 at the turning angle.

It should be noted that the connector of the present invention is a pre-manufactured product so that the rail connector can be mass-produced with many specifications so that when assembled in working site, the connector can be easily and conveniently rotated to a suitable angle to be inserted and secured by adhesive agent at the turning angle between the upper and lower rails. After the adhesive agent is solidified, the assembling procedure is completed. In contrast to the present invention, according to a conventional working measure, an experienced welding expert or skilled technician is required and it is necessary to carry a cutting machine, a point welding machine and a grinding machine floor by floor. In practical working site, more twenty rail connectors of the present invention can be assembled in one day, while only three conventional rail connectors can be assembled in one day. Therefore, the working time and labor cost are greatly shortened and reduced and the working efficiency is increased several times.

The rail connector of the present invention is pre-manufactured and the quality of the product can be controlled in the factory, whereby during working, it is unnecessary to consider whether the surface color and brightness of the connector are identical to those of the original rails.

In addition, the connecting ends 12, 22 of the first and second curved tubes 1, 2 have a smaller diameter, which are inserted into the openings of the rails 6 and secured therein by the adhesive agent specific for stainless steel. Therefore, the welding procedure is no more required. In use, the turning angle generally will not suffer great force so that it is unnecessary to connect the rails by welding.

Moreover, the two semicircular interconnecting rings are disposed in the annular groove 32 of the interconnecting seat 3 opposite to each other and secured to the second curved tube 2 by point welding. The arrangement of two semicircular interconnecting rings is designed for facilitating the assembling procedure and solving the problem that the outer diameter of the front end 33 in front of the annular groove 32 is larger than the inner diameter of a circular interconnecting ring and the circular interconnecting ring cannot be fitted into the annular groove 32.

The fitting ring 4 disposed between the first and second curved tubes 1, 2 serves to compensate the clearance therebetween. The fitting rings 4 disposed between the first and second curved tubes 1, 2 and the upper and lower rails 6 serve to form a tidy appearance of the rail connector.

Therefore, a fitting ring made of different material such as copper or made with other color can be added to the connector to enhance the appearance and quality of the entire connector.

It is to be understood that the above description and drawings are only used for illustrating one embodiment of the present invention, not intended to limit the scope thereof. Any variation and derivation from the above description and drawings should be included in the scope of the present invention.

What is claimed is:

1. A stairs rail connector comprising:

a first and a second curved tubes, each of said tubes having an interconnecting end and a small diameter connecting end, an interconnecting seat being secured to the interconnecting end of the first curved tube, an outer periphery of the interconnecting seat contacting with an inner periphery of the interconnecting end of the first curved tube, the interconnecting seat having an extension section axially forward extending by a certain length for a fitting ring to fit therearound, an annular groove being formed on the extension section for two semicircular interconnecting rings to fit therein, an outer diameter of each of said interconnecting rings being equal to an inner diameter of the interconnecting end of the second curved tube and a clearance being defined between an inner diameter of the semicircular interconnecting ring and an outer diameter of the annular groove for relative rotation, the two interconnecting rings being fitted into the interconnecting end of the second curved tube and secured therein, whereby the fitting ring is positioned between the interconnecting ends of the first and second curved tubes and whereby the first and second curved tubes can be relatively rotated about the interconnecting seat and the interconnecting rings, an outer diameter of the connecting ends being equal to the inner diameter of the first and second curved tubes, the first and second curved tubes being first rotatable to a position corresponding to a turning angle between an upper and a lower rails, then the connecting ends being adapted to be inserted into and secured in openings of the upper and lower rails to integrally connect the upper and lower rails at the turning angle.

2. A stairs rail connector as claimed in claim 1, wherein the interconnecting seat is secured to the interconnecting end of the first curved tube by point welding and the two semicircular interconnecting rings are secured to the interconnecting end of the second curved tube by point welding.

3. A stairs rail connector as claimed in claim 1, wherein the extension section has a frustum-like conic front end in front of the annular groove for facilitating the fitting of the fitting ring.

4. A stairs rail connector as claimed in claim 1, further comprising two fitting rings, wherein said two fitting rings are respectively fitted around the connecting ends of the first and second curved tubes.

* * * * *